United States Patent
Kaneko et al.

(10) Patent No.: US 10,406,625 B2
(45) Date of Patent: Sep. 10, 2019

(54) SEAM-WELDING METHOD AND DEVICE THEREFOR

(71) Applicant: HONDA MOTOR CO., LTD., Minato-Ku, Tokyo (JP)

(72) Inventors: Mitsugu Kaneko, Tochigi-ken (JP); Yasuhiro Kawai, Tochigi-ken (JP); Haruhiko Kobayashi, Tochigi-ken (JP); Yuki Tanihira, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 15/325,960

(22) PCT Filed: Jul. 17, 2014

(86) PCT No.: PCT/JP2014/069068
§ 371 (c)(1),
(2) Date: Jan. 12, 2017

(87) PCT Pub. No.: WO2016/009530
PCT Pub. Date: Jan. 21, 2016

(65) Prior Publication Data
US 2017/0165784 A1 Jun. 15, 2017

(51) Int. Cl.
*B23K 11/06* (2006.01)
*B23K 11/24* (2006.01)
(Continued)

(52) U.S. Cl.
CPC ............ *B23K 11/06* (2013.01); *B23K 11/061* (2013.01); *B23K 11/16* (2013.01); *B23K 11/24* (2013.01);
(Continued)

(58) Field of Classification Search
CPC ........ B23K 11/06; B23K 11/24; B23K 11/241
(Continued)

(56) References Cited

U.S. PATENT DOCUMENTS

| 2,175,920 A | * | 10/1939 | Schnarz | B23K 11/248 219/114 |
| 2,262,705 A | * | 11/1941 | Tuttle | B23K 11/16 148/524 |
| 3,823,299 A | * | 7/1974 | Metcalfe | B21B 45/004 219/110 |

FOREIGN PATENT DOCUMENTS

| JP | 11-058026 A | 3/1999 |
| JP | 3124033 U | 8/2006 |

(Continued)

OTHER PUBLICATIONS

PCT/ISA/210 in both English and Japanese languages from PCT/JP2014/069068.

*Primary Examiner* — Thien S Tran
(74) *Attorney, Agent, or Firm* — Carrier Blackman & Associates, P.C.; Joseph P. Carrier; Jeffrey T. Gedeon (57) ABSTRACT

This seam-welding device carries out seam welding while repeating one cycle comprising a melting period, an interruption period, and a heating period implemented either before or after the interruption period. A welding current is applied between a pair of roller electrodes so as to form a welded part between workpieces during the melting period, the application of the current between the roller electrode pair is interrupted so as to solidify the welded part during the interruption period, and a heating current smaller than the welding current is applied between the roller electrode pair so as to heat the laminated body within a solidification temperature range of the welded part during the heating period. Consequently, even when the welding speed is increased, formation of cracks and spatter is effectively suppressed such that a high-quality joined product is obtained.

6 Claims, 6 Drawing Sheets

(51) Int. Cl.
*B23K 11/16* (2006.01)
*B23K 11/30* (2006.01)
*B23K 11/31* (2006.01)
*B23K 101/00* (2006.01)
*B23K 101/18* (2006.01)
*B23K 103/04* (2006.01)

(52) U.S. Cl.
CPC ........ *B23K 11/3036* (2013.01); *B23K 11/315* (2013.01); *B23K 11/241* (2013.01); *B23K 2101/006* (2018.08); *B23K 2101/18* (2018.08); *B23K 2103/04* (2018.08)

(58) Field of Classification Search
USPC .......................... 219/67, 81, 82, 117.1, 118
See application file for complete search history.

(56) References Cited

FOREIGN PATENT DOCUMENTS

| | | |
|---|---|---|
| JP | 2007-167896 A | 7/2007 |
| JP | 2010-194543 A | 9/2010 |
| WO | 99/14008 A1 | 3/1999 |

\* cited by examiner

SEAM-WELDING METHOD AND DEVICE THEREFOR

TECHNICAL FIELD

The present invention relates to a seam-welding method and a seam-welding device for performing seam welding by supplying current intermittently to a pair of roller electrodes that sandwich a stacked assembly comprising a plurality of stacked workpieces and applying pressure thereto, and causing the rollers to move relatively by rotating the rollers.

BACKGROUND ART

Figure 6A:
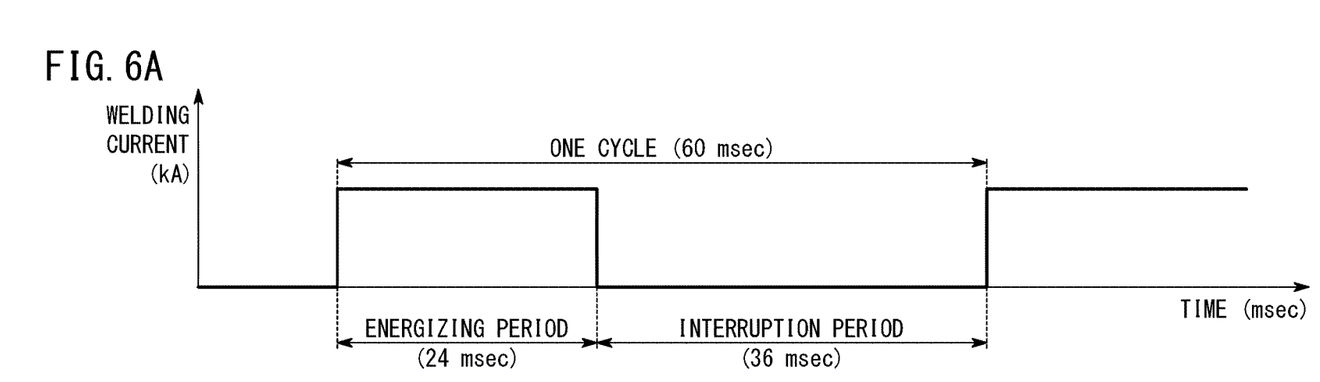
FIG. 6A is a timing chart showing an example of an energizing cycle of a seam-welding method.

A seam-welding method is known for joining workpieces together by forming a plurality of nuggets continuously in an overlapping manner between the workpieces in the form of a stacked assembly in which plural workpieces made up from metal plates or the like are stacked. In such a seam-welding method, current is supplied intermittently to a pair of roller electrodes that sandwich and apply pressure to the stacked assembly while the rollers are made to rotate. More specifically, as in the energizing (i.e., current supplying) cycle shown in FIG. 6A, the roller electrodes are moved relatively with respect to the stacked assembly while repeatedly performing, as one cycle (e.g., 60 msec), an energizing period (e.g., 24 msec) during which current is supplied between the roller electrodes to energize the electrodes, and an interruption period (e.g., 36 msec) during which the supply of current to the roller electrodes is interrupted.

During the energizing period, resistance heating (Joule heat) is generated in the vicinity of contact surfaces of the workpieces that are pressed by the roller electrodes, and a molten portion is formed therein. In addition, during the interruption period, a location of the stacked assembly where the molten portion has been formed is cooled while being pressed by the roller electrodes, whereby the molten portion becomes solidified to form a nugget. As a result, in the foregoing manner, nuggets are formed continuously in a mutually overlapping manner between the workpieces, and seam welding of the stacked workpiece is thereby carried out.

Incidentally, recently, for example, it has been proposed to mount a seam-welding device on which roller electrodes are provided on a robot, and to carry out seam welding of large scale workpieces such as component parts for an automotive body. In this case, it is sought to increase the welding speed without increasing the size and scale of the seam-welding device.

However, if the relative speed of movement of the roller electrodes is increased in order to increase the welding speed, there is a concern that the roller electrodes may become separated or distanced from the molten portion before the molten portion has solidified adequately during the interruption period. In this case, the molten portion becomes solidified under a condition in which the pressing force by the roller electrodes is reduced or is not applied at all, and upon solidification of the molten portion, it is likely for cracks to develop due to volumetric contraction or the like.

As a means for bringing about solidification of the molten portion promptly prior to moving the roller electrodes, it may be considered to cool the molten portion through use of cooling water. However, in this case, there is a need to provide cooling equipment including piping or the like for the cooling water. Further, if a condition is left in which the cooling water remains adhered to the automotive body or the component parts, since there is a concern that rust or the like may occur, in the case that the adhered cooling water is removed, further additional equipment is required. Consequently, from the standpoint of avoiding an increase in size of the seam-welding device, cooling of the molten portion using cooling water is not preferred.

Figure 6B:
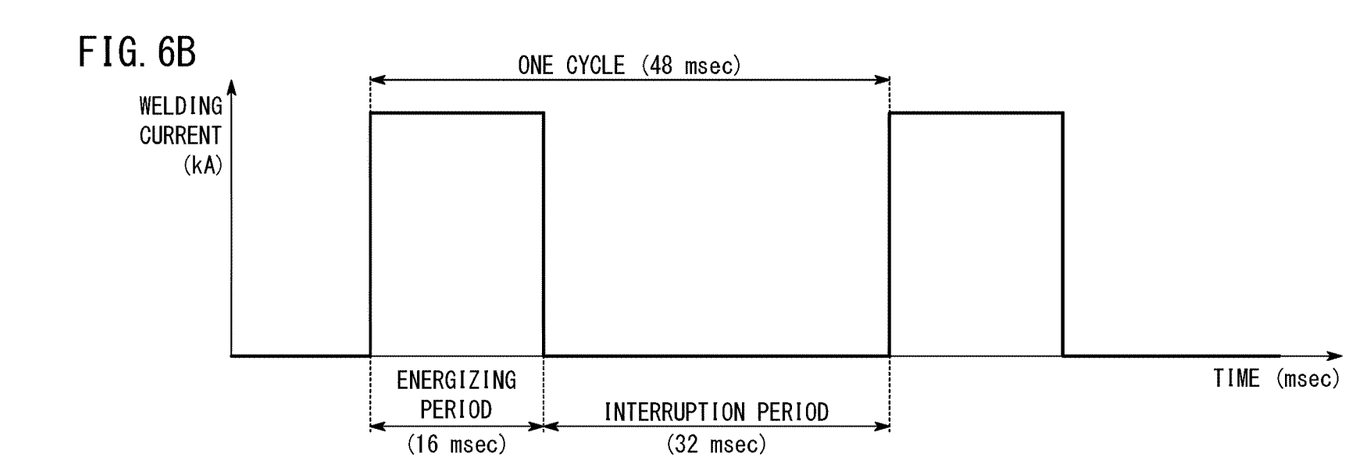
FIG. 6B is a timing chart showing another example of an energizing cycle of a seam-welding method.

Thus, as shown in FIG. 6B, along with increasing the welding speed, it has been considered to shorten one cycle (e.g., 48 msec), together with increasing the proportion of the interruption period (e.g., 32 msec) within the one cycle. In accordance therewith, the proportion of the interruption period is increased relative to the energizing period (16 msec), and the timing at which solidification of the molten portion begins can be hastened or made to occur sooner. As a result, it is possible for the molten portion to become solidified prior to moving the roller electrodes, or stated otherwise, under a condition in which the pressing force is applied to the molten portion.

However, as described above, when the proportion of the energizing period is decreased, and the proportion of the interruption period is increased within one cycle, there is a concern that the stacked assembly may be subjected to cooling more than necessary. As a result, due to the fact that electrical resistance in the stacked assembly is decreased, the required melting current for the purpose of forming the molten portion is made greater, and it is likely for spatter to occur. Further, the temperature difference of the stacked assembly between the energizing period and the interruption period increases, and due to the fact that a large volumetric change therein occurs, ultimately, it becomes difficult for cracks or the like to be suppressed sufficiently.

In order to suppress cooling of the stacked assembly more than necessary, it may be considered to adopt the seam-welding method disclosed in Japanese Laid-Open Patent Publication No. 11-058026. More specifically, seam welding is carried out in which a first heat-inputting welding current P, which is capable of forming a molten portion, and a second welding current B, the heat-input of which is smaller than that of the first welding current P, are supplied alternately, and an interruption period during which the welding current is interrupted is not provided.

SUMMARY OF INVENTION

With the seam-welding method disclosed in Japanese Laid-Open Patent Publication No. 11-058026, since the molten portion is solidified while the second welding current B is being supplied, although cooling of the stacked assembly more than necessary can be avoided, on the other hand, it is difficult for the molten portion to be solidified quickly and sufficiently. Consequently, in the foregoing manner, when the welding speed is increased, the roller electrodes are moved from over the molten portion prior to the molten portion being solidified sufficiently, and due to the fact that the pressing force at the time of solidification is inadequate, there is a concern that cracks or the like will be generated. Ultimately, even if the seam-welding method of Japanese Laid-Open Patent Publication No. 11-058026 is adopted, it is difficult to obtain joined products of high product quality, in which cracks and spatter are suppressed while increasing the welding speed.

The present invention has been devised in order to solve the problems discussed above, and has the object of providing a seam-welding method and a device therefor, by which joined products of high product quality can be obtained, and in which cracks and spatter are suppressed while increasing the welding speed.

In order to achieve the aforementioned object, the present invention is characterized by a seam-welding method for performing seam welding by intermittently energizing or supplying current between a pair of roller electrodes that sandwich a stacked assembly formed by stacking a plurality of workpieces, together with causing the roller electrodes to move relatively while applying a pressing force with respect to the stacked assembly, the seam-welding method carrying out seam welding while repeating one cycle comprising a melting period during which a melting current is supplied between the roller electrodes, and a molten portion is formed between the workpieces, a heating period during which a heating current, which is smaller than the melting current, is supplied between the roller electrodes, and the stacked assembly is heated within a temperature range to solidify the molten portion, and an interruption period implemented at least one of before and after the heating period, and during which the supply of current between the roller electrodes is interrupted.

In the seam-welding method according to the present invention, in one cycle, which is an energizing cycle of the roller electrodes, there are provided the melting period during which the melting current is supplied for forming the molten portion, the interruption period during which the supply of current is interrupted and the molten portion is solidified, and the heating period. In the heating period, the stacked assembly is heated within a temperature range (e.g., less than a freezing or solidification point) at which the molten portion is solidified. Therefore, despite being heated, the molten portion is capable of solidifying. More specifically, within one cycle, the interruption period and the heating period serve as a period (solidification period) during which the molten portion is cooled and can be made to solidify.

In this manner, by the portion at which the heating period is implemented, the proportion of the solidification period increases with respect to the melting period within one cycle, and the timing at which solidification of the molten portion begins can be made to occur sooner. As a result, even though the welding speed is increased, moving of the roller electrodes away from the molten portion prior to the molten portion becoming solidified is avoided, and therefore, the molten portion can be made to solidify while the pressing force remains adequately applied.

Further, even though the proportion of the solidification period within one cycle is increased as described above, because the heating current is supplied over the heating period that lies within the solidification period, an excessive enlargement of the proportion of the interruption period during which the supply of current is interrupted can be avoided. Consequently, cooling of the stacked assembly more than necessary can be avoided. As a result, without increasing the melting current, since the molten portion can suitably be formed between the workpieces, generation of spatter or the like can be suppressed. Further, since an abrupt change in the volume of the stacked assembly due to the change in temperature between the melting period and the solidification period can be suppressed, it is possible to suppress the occurrence of cracking in the nuggets or the like. Consequently, with the seam-welding method, even though the welding speed is increased, cracking and spatter can effectively be suppressed, and joined products of high product quality can be obtained.

In the above-described seam-welding method, the heating period within the one cycle may be implemented before the interruption period. In this case, for example, the one cycle is set in order of the melting period, the heating period, and the interruption period. More specifically, after the molten portion has been formed by supplying the melting current within the melting period, the heating current, which is smaller than the melting current, is supplied in the heating period. In accordance therewith, in the heating period, heating can be performed so that the stacked assembly is not cooled rapidly, and is not cooled more than necessary.

Further, the temperature at which the stacked assembly is heated lies within a range at which the molten portion solidifies, and therefore, after the melting period, the molten portion can promptly start to solidify. More specifically, the molten portion can be made to solidify under a state in which the pressing force by the roller electrodes is applied sufficiently, and thus the occurrence of cracking or the like can be suppressed. Furthermore, after the heating period, by implementing the interruption period in which the supply of current is interrupted, the molten portion can be solidified adequately, and nuggets can suitably be formed between the workpieces.

Consequently, by implementing the heating period between the melting period and the interruption period, even though the stacked assembly is cooled during the interruption period, an abrupt change in the volume of the stacked assembly, or an increase in the melting current due to a decrease in the electrical resistance of the stacked assembly can be avoided. Therefore, even though the welding speed is increased, spatter or the occurrence of cracking or the like can effectively be suppressed, and joined products of high product quality can be obtained.

In the above-described seam-welding method, the heating period within the one cycle may be implemented after the interruption period. In this case, for example, the one cycle is set in order of the melting period, the interruption period, and the heating period. More specifically, after the molten portion has been formed by supplying the melting current within the melting period, by implementing the interruption period during which the supply of current is interrupted, the molten portion is allowed to solidify. In addition, after the interruption period, or stated otherwise, before the melting period in the next one cycle, the heating period is implemented, and by supplying the heating current, the stacked assembly can be preheated to within a temperature range at which the molten portion remains solidified.

More specifically, in the melting period of the next one cycle, the melting current can be supplied with respect to the stacked assembly in a state in which electrical resistance has been raised as a result of being heated in the above manner. As a result, since the molten portion can suitably be formed without increasing the melting current, the occurrence of spatter or the like can effectively be suppressed.

Further, in the foregoing manner, in the heating period as well, because the stacked assembly is kept within a temperature range at which the molten portion solidifies, by the portion at which the heating period is provided, the proportion of the solidification period with respect to the melting period within one cycle can be increased, and the timing at which solidification of the molten portion begins can be made to occur sooner. Therefore, even though the welding speed is increased, the molten portion can be solidified while the pressing force is applied, and the occurrence of cracking in the nuggets can be suppressed. As a result, while increasing the welding speed, joined products of high product quality can be obtained.

Moreover, in the present invention, there is also included a seam-welding device by which the above-described seam-welding method is applied.

More specifically, the present invention is characterized by a seam-welding device that performs seam welding by intermittently supplying current between a pair of roller electrodes that sandwich a stacked assembly formed by stacking a plurality of workpieces, together with causing the roller electrodes to move relatively while applying a pressing force with respect to the stacked assembly, the seam-welding device repeatedly supplying current and stopping supply of the current in one cycle with respect to the roller electrodes, the one cycle including a melting period during which a melting current is supplied between the roller electrodes, and a molten portion is formed between the workpieces, a heating period during which a heating current, which is smaller than the melting current, is supplied between the roller electrodes, and the stacked assembly is heated within a temperature range to solidify the molten portion, and an interruption period implemented at least one of before and after the heating period, and during which the supply of current between the roller electrodes is interrupted.

Further, in the aforementioned seam-welding device, the heating period within the one cycle may be implemented before the interruption period, or the heating period within the one cycle may be implemented after the interruption period.

DESCRIPTION OF EMBODIMENTS

In relation to a seam-welding method according to the present invention, preferred embodiments of the present invention will be described in detail below with reference to the accompanying drawings.

First Embodiment

Figure 1:
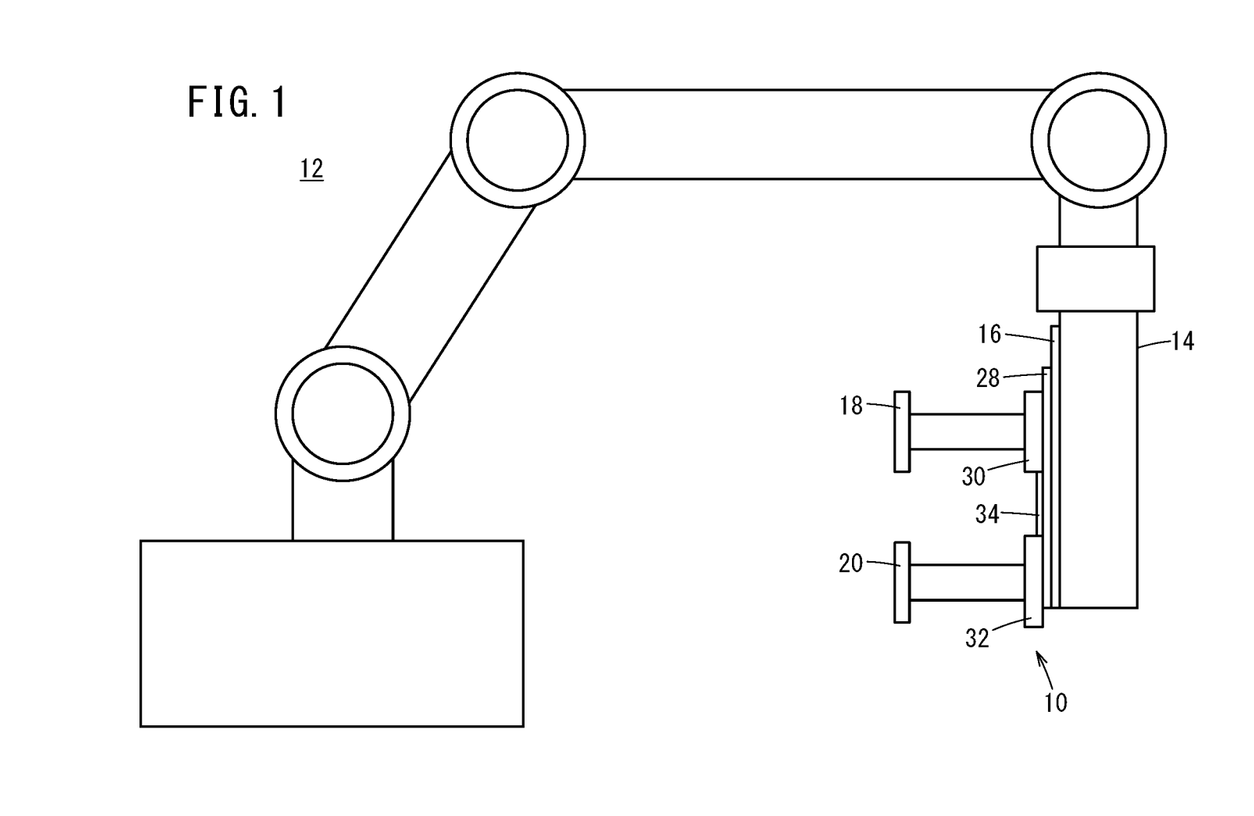
FIG. 1 is an overall side view in outline form of an articulated robot equipped with a seam-welding device according to the present invention.
Figure 2:
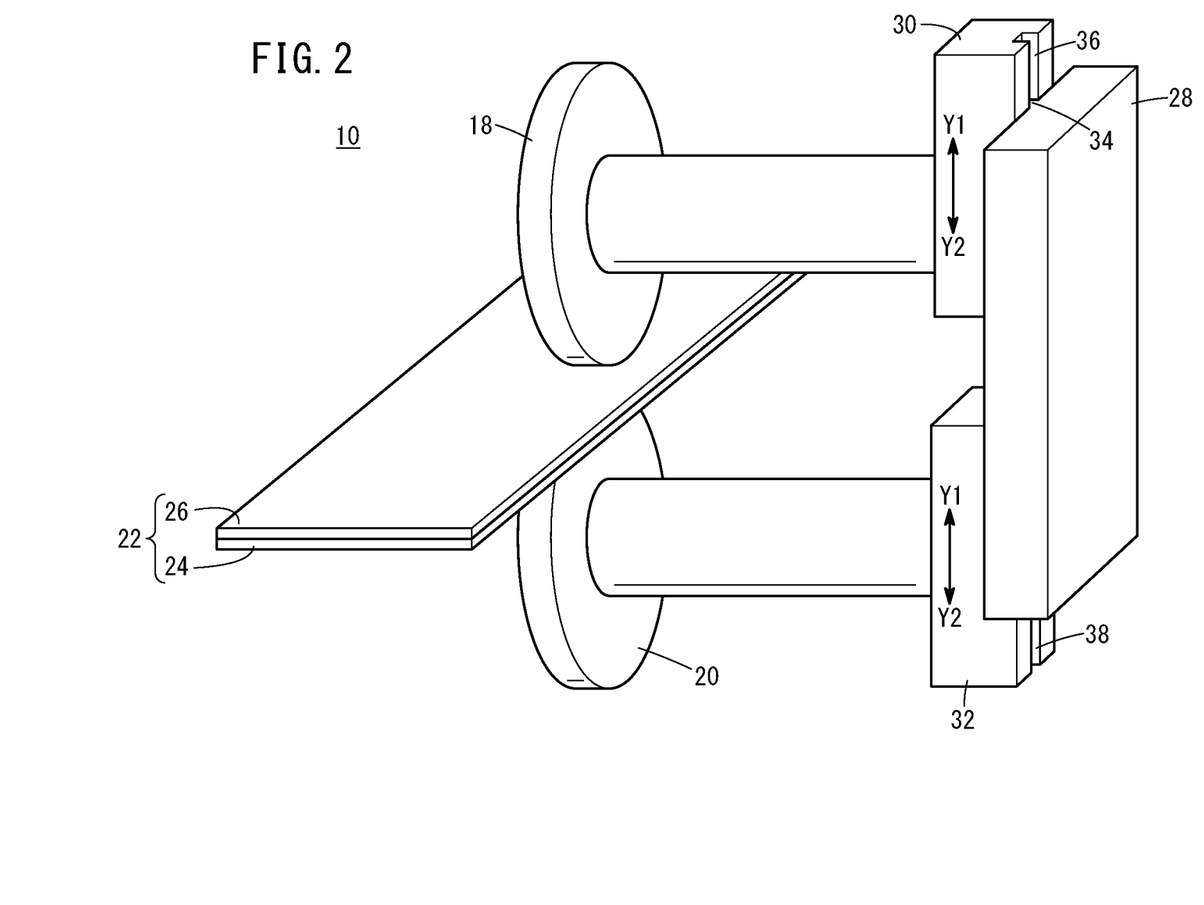
FIG. 2 is a perspective view of essential parts of the seam-welding device shown in FIG. 1.

FIG. 1 is an overall side view in outline form of an articulated robot 12 equipped with a seam-welding device 10 according to an embodiment, and FIG. 2 is a perspective view of essential parts of the seam-welding device 10. The seam-welding device 10 is supported on a distal end arm 14 of the articulated robot 12. The structure of the articulated robot 12, which is equipped with the seam-welding device 10 as discussed above, is well known as disclosed in Japanese Laid-Open Patent Publication No. 2007-167896 and Japanese Utility Model Registration No. 3124033, and therefore, detailed description of this structure is omitted.

The seam-welding device 10 comprises a first roller electrode 18 and a second roller electrode 20, which are supported through a mount 16 (see FIG. 1) on the distal end arm 14. The second roller electrode 20 is positioned downwardly of a stacked assembly 22 (see FIG. 2), and the first roller electrode 18 is positioned upwardly of the stacked assembly 22. More specifically, the stacked assembly 22 is sandwiched and gripped between the first roller electrode 18 and the second roller electrode 20.

The stacked assembly 22, which is the object to be welded, is constituted by stacking in order from below two workpieces 24, 26 in the form of metal plates. The workpieces 24, 26, for example, are made up from high-tensile steels such as JAC590, JAC780, or JAC980 (all of which are high-performance high-tensile steel sheets defined according to the Japan Iron and Steel Federation Standard). Further, the respective thicknesses of the workpieces 24, 26 are set from roughly 1 mm to roughly 2 mm. The number of workpieces that are stacked is not limited to two as shown in the illustrated example, and may be three or more.

A guide rail 28 is laid on the mount 16. A first cylinder and a second cylinder (neither of which are shown) are supported on the guide rail 28. The first cylinder displaces the first roller electrode 18, which is supported on a first moving table 30, in directions to approach toward and separate away from the second roller electrode 20. The second cylinder displaces the second roller electrode 20, which is supported on a second moving table 32, in directions to approach toward and separate away from the first roller electrode 18. Moreover, any one of the first roller electrode 18 and the second roller electrode 20 may be supported on the first moving table 30 or the second moving table 32, whereas the other one may be supported on a stationary table (not shown).

A first rotating motor (not shown) for rotatively energizing the first roller electrode 18 is supported on the first moving table 30, and a second rotating motor (not shown) for rotatively energizing the second roller electrode 20 is supported on the second moving table 32. Since this type of structure is well known, illustration and detailed description thereof are omitted. Further, instead of the first cylinder and the second cylinder, servomotors or the like may be employed.

A recessed part 36 (see FIG. 2) of the first moving table 30 on which the first roller electrode 18 is supported, and a recessed part 38 (see FIG. 2) of the second moving table 32 on which the second roller electrode 20 is supported are slidably engaged with a projecting part 34 of the guide rail 28. The first moving table 30 is connected to a non-illustrated first rod of the aforementioned first cylinder. Further, the second moving table 32 is connected to a non-illustrated second rod of the aforementioned second cylinder.

More specifically, accompanying advancing and retracting operations of the first rod of the first cylinder, the first roller electrode 18 undergoes displacement in directions (direction of the arrow Y2, direction of the arrow Y1) to approach toward and separate away from the second roller electrode 20. On the other hand, accompanying advancing and retracting operations of the second rod of the second cylinder, the second roller electrode 20 undergoes displacement in directions (direction of the arrow Y1, direction of the arrow Y2) to approach toward and separate away from the first roller electrode 18.

A first shaft (not shown) is interposed between the first roller electrode 18 and the first moving table 30. The first shaft is rotated under the action of the first rotating motor, whereby the first roller electrode 18 is operated to rotate. Similarly, the second roller electrode 20 is operated to rotate accompanying a second shaft (not shown) being rotated under the action of the second rotating motor.

Although not illustrated, the first roller electrode 18 and the second roller electrode 20, respectively, are connected electrically to a positive electrode and a negative electrode of a power supply that is capable of supplying a welding current, such as a DC inverter power supply, or an AC power supply or the like, through lead wires (power lines) interposed with a switch. By turning the switch on or off, any one of a later-described melting current and a heating current can be supplied between the first roller electrode 18 and the second roller electrode 20, or the supply of such currents can be interrupted. Hereinafter, the melting current and the heating current will also be referred to collectively as a welding current. Further, for the switch, for example, there can be adopted an electronic switch in which a power element is utilized.

In the above-described configuration, the first and second cylinders, the first and second rotating motors, the AC power supply, and the switch are electrically connected to a control unit that serves as a control means. More specifically, operations or energizing and deenergizing of the first and second cylinders, the first and second rotating motors, the AC power supply, and the switch are controlled by a control unit. Stated otherwise, the control unit also functions as a current supply timing control means.

The seam-welding device 10 according to the present embodiment is constructed basically as has been described above. Next, effects and advantages of the seam-welding device 10 will be described in relation to a seam-welding method according to the present embodiment.

First, the articulated robot 12 moves the distal end arm 14, and more specifically the seam-welding device 10, so that the stacked assembly 22 is arranged between the first roller electrode 18 and the second roller electrode 20.

Thereafter, under an action of the control unit, the first cylinder and the second cylinder are energized, and along therewith, advancing operations of the first rod and the second rod are started. More specifically, the second roller electrode 20 is displaced in the direction of the arrow Y1 so as to approach the first roller electrode 18, and the first roller electrode 18 is displaced in the direction of the arrow Y2 so as to approach the second roller electrode 20. As a result, the stacked assembly 22 is sandwiched and gripped between the first roller electrode 18 and the second roller electrode 20.

At this time, the propulsive force of the first rod of the aforementioned first cylinder, and the propulsive force of the second rod of the aforementioned second cylinder are controlled, so that the pressing force (F1) of the first roller electrode 18 with respect to the workpiece 26 is brought into equilibrium with the pressing force (F2) of the second roller electrode 20 with respect to the workpiece 24.

Next, by rotating the first and second rotating motors at a predetermined RPM (rotations per minute), the first roller electrode 18 and the second roller electrode 20 (hereinafter also referred to collectively as a roller electrode pair) are moved relatively at a predetermined speed in a direction of movement with respect to the stacked assembly 22. The predetermined speed at which the roller electrode pair is moved relatively can be, for example, on the order of 2.0 meters per minute (m/min).

Figure 3:
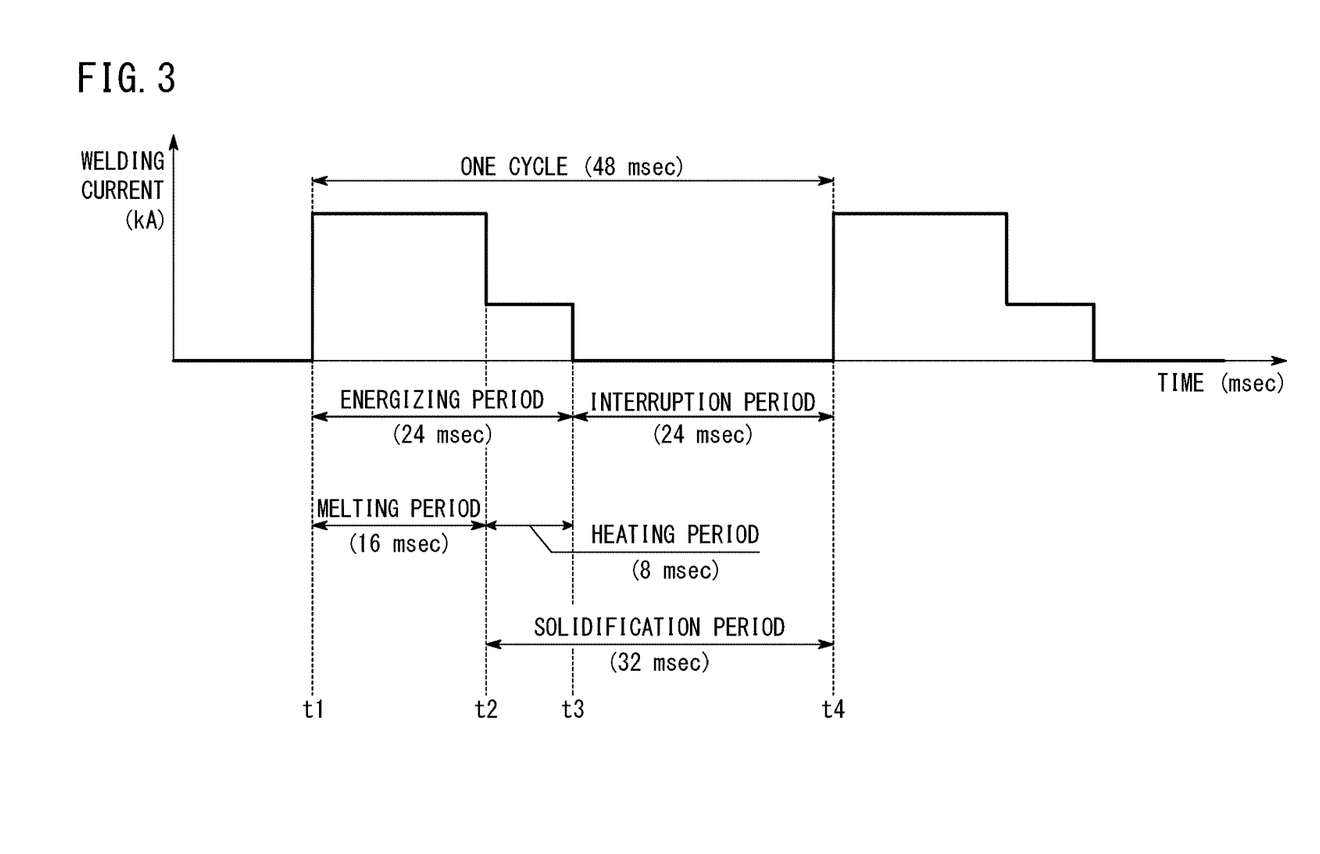
FIG. 3 is a timing chart showing an energizing cycle of a seam-welding method according to a first embodiment of the present invention.

At this time, with the energizing cycle shown by the timing chart of FIG. 3, an on state and an off state of the aforementioned switch are switched. As noted above, the first roller electrode 18 and the second roller electrode 20 are connected respectively to the positive electrode and the negative electrode of the AC power supply. Therefore, during the on state of the switch, the energizing period is brought about, in which the welding current is supplied from the first roller electrode 18 to the second roller electrode 20. Further, during the off state of the switch, the interruption period is brought about, in which supply of the welding current is interrupted.

More specifically, according to the seam-welding method, by the seam-welding device 10, seam welding is carried out by supplying current intermittently between the roller electrode pair that sandwiches the stacked assembly 22, together with moving the roller electrode pair while pressing forces F1, F2 are applied with respect to the stacked assembly 22.

Figure 4A:
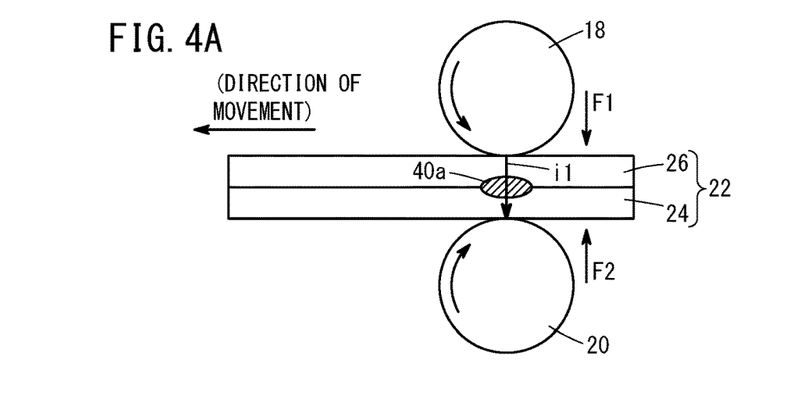
FIG. 4A is a schematic descriptive view of a roller electrode pair and a stacked assembly in a melting period.
Figure 4B:
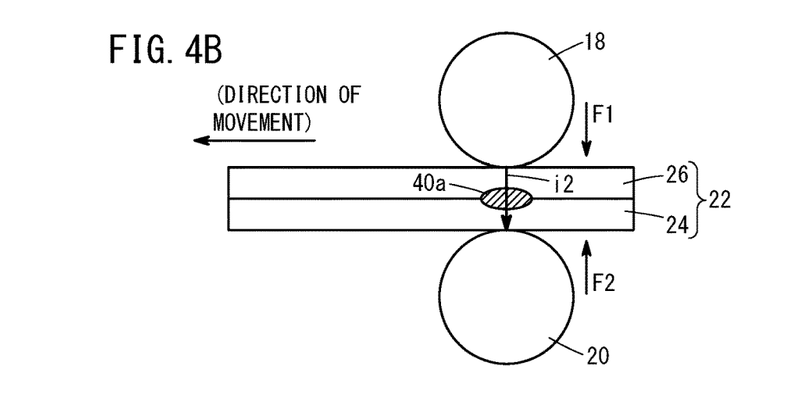
FIG. 4B is a schematic descriptive view of the roller electrode pair and the stacked assembly in a heating period.
Figure 4C:
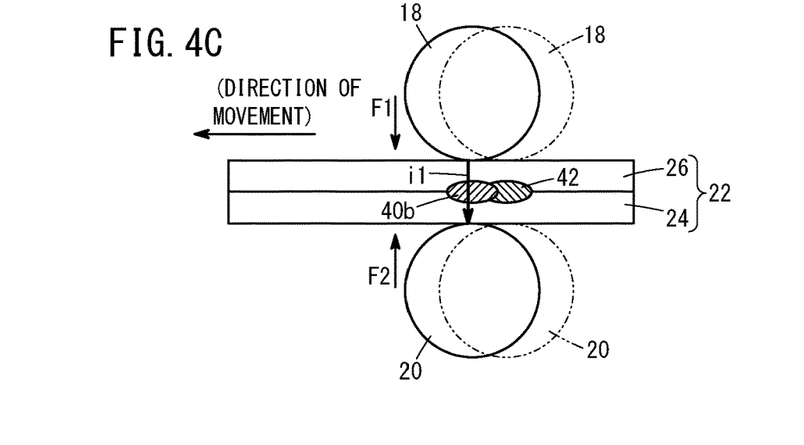
FIG. 4C is a schematic descriptive view of the roller electrode pair and the stacked assembly in an interruption period and a melting period of a next one cycle.

Below, a detailed explanation will be given with reference to FIG. 3 and FIGS. 4A through 4C concerning the energizing cycle of the seam-welding device 10. FIGS. 4A through 4C are schematic descriptive views showing in the form of a time series a relationship between the energizing cycle of FIG. 3 and welding states of the stacked assembly 22. Moreover, in the illustrated example of FIG. 3, one cycle of the energizing cycle is roughly 48 msec.

First, as shown in FIGS. 3 and 4A, between times t1 to t2, the switch is placed in an on state, and the melting period is brought about, in which the melting current i1 is supplied between the roller electrode pair. The melting current i1 generates resistance heating, and is set to an intensity capable of heating and melting at a location in the vicinity of the contact surfaces of the workpiece 24, 26. More specifically, during the melting period, by supplying the melting current i1 between the roller electrode pair, a molten portion 40a can be formed between the workpieces 24, 26.

In the foregoing manner, if one cycle of the energizing cycle is 48 msec, for example, the melting period may be roughly 16 msec. Further, although the intensity of the melting current i1 may be set appropriately depending on factors such as the material and shape of the workpieces 24, 26, or the length of the melting period, etc., the melting current i1 can be set, for example, to about 16 to 18 kA.

Next, as shown in FIGS. 3 and 4B, between times t2 to t3, a heating period is brought about, in which a heating current i2, which is smaller than the melting current i1, is supplied between the roller electrode pair. The heating current i2 is set to an intensity that is capable of heating the stacked assembly 22 within a temperature range (e.g., less than a freezing or solidification point of the molten portion 40a) at which the molten portion 40a is solidified. Accordingly, in the heating period, while the molten portion 40a that was formed in the melting period solidifies, the stacked assembly 22 can be heated in order to prevent the stacked assembly 22 from rapidly cooling and being cooled more than necessary.

The heating period can be set to roughly 8 msec. Further, the size of the heating current i2 can be set to roughly 8 kA.

In the foregoing manner, although the roller electrode pair is moved relatively with respect to the stacked assembly 22, from time t2 to time t3 in the heating period, with respect to the location where the molten portion 40a of the stacked assembly 22 is formed, the roller electrode pair is at a position where sufficient pressing forces F1, F2 can be applied. Consequently, in the heating period, while sufficient pressing forces F1, F2 are applied from the roller electrode pair, solidification of the molten portion 40a can begin.

Next, as shown in FIGS. 3 and 4C, between times t3 to t4, the switch is placed in an off state, and the interruption period is brought about, in which supply of the welding current between the roller electrode pair is interrupted. More specifically, in this time zone, heating (warming) in the vicinity of the contact surfaces between the workpieces 24, 26 is discontinued. Owing thereto, conduction of heat occurs from the stacked assembly 22 to the roller electrode pair, whereby the stacked assembly 22 is cooled. As a result, the molten portion 40a is solidified adequately, and a nugget 42 can be formed. The interruption period is set to roughly 24 msec.

Even in the interruption period from time t3 to time t4, the roller electrode pair is at a position (in the vicinity of the position shown by the two-dot-dashed line) where sufficient pressing forces F1, F2 can be applied with respect to the location where the molten portion 40a of the stacked assembly 22 is formed. Consequently, the molten portion 40a can be made to solidify sufficiently while the influence of volumetric contraction or the like when the stacked assembly 22 undergoes solidification is suppressed. As a result, in the vicinity of the contact surfaces of the workpieces 24, 26, a nugget 42 can be formed in which generation of cracking or the like is effectively suppressed.

Thereafter, as shown in FIG. 4C, the roller electrode pair is moved relatively along a direction of movement so as to separate away from the location where the molten portion 40a of the stacked assembly 22 was formed. At such a position, as discussed above, the switch is placed in an on state, and by bringing about the melting period, in which the melting current i1 is supplied between the roller electrode pair, a new molten portion 40b can be formed between the workpieces 24, 26. In this manner, by repeatedly carrying out the next one cycle of the energizing cycle in the same manner as described above, it is possible to form a new nugget (not shown) that is connected with the nugget 42. More specifically, since the nuggets themselves are connected through overlapping portions, it is possible to obtain a welded product in which the workpieces 24, 26 themselves are firmly connected.

As understood from the above, according to the seam-welding method, within one cycle, which is the energizing cycle in which current is supplied between the roller electrode pair, the interruption period and the heating period serve as a period (solidification period) during which the molten portions 40a, 40b are cooled and can be made to solidify. Stated otherwise, by the portion at which the heating period is implemented, the proportion of the solidification period (e.g., 32 msec) increases with respect to the melting period (e.g., 16 msec) within one cycle (e.g., 48 msec), and the timing at which solidification of the molten portions 40a, 40b, etc., begins can be made to occur sooner. As a result, even though the welding speed is increased, moving of the roller electrode pair away from the molten portions 40a, 40b, etc., prior to the molten portions 40a, 40b, etc., becoming solidified is avoided. Therefore, the molten portions 40a, 40b can be made to solidify while the pressing forces F1, F2 remain adequately applied.

Further, even though the proportion of the solidification period within one cycle is increased as described above, because the heating current i2 is supplied over the heating period that lies within the solidification period, an excessive enlargement of the proportion of the interruption period during which the supply of current is interrupted can be avoided. Consequently, cooling of the stacked assembly 22 more than necessary can be avoided. As a result, since the molten portions 40a, 40b can suitably be formed between the workpieces 24, 26 without increasing the melting current i1, generation of spatter or the like can be suppressed. Further, since an abrupt change in the volume of the stacked assembly 22 due to the change in temperature between the melting period and the solidification period can be suppressed, it is possible to suppress the occurrence of cracking in the nuggets 42 or the like. Therefore, with the seam-welding method, even though the welding speed is increased, spatter or the occurrence of cracking or the like can effectively be suppressed, and joined products of high product quality can be obtained.

Further, when solidification of the molten portions 40a, 40b is brought about promptly prior to moving the roller electrode pair in the manner described above, it is unnecessary to use cooling water and provide cooling equipment including piping or the like for the cooling water. More specifically, the welding speed can be increased without increasing the size and scale of the seam-welding device 10. Therefore, the seam-welding device 10 can suitably be mounted on the articulated robot 12. Further, even in the case that the workpieces 24, 26 are large scale component parts for an automotive body or the like, it is possible to carry out seam welding of the workpieces 24, 26 favorably and effectively.

Second Embodiment

Next, a seam-welding method according to a second embodiment of the present invention will be described. Concerning the seam-welding method of the present invention, in the second embodiment, with the exception of supplying current intermittently with respect to the roller electrode pair using the energizing (current supplying) cycle shown by the timing chart of FIG. 5, it is possible to carry out seam welding using the same seam-welding device 10 as in the first embodiment.

Figure 5:
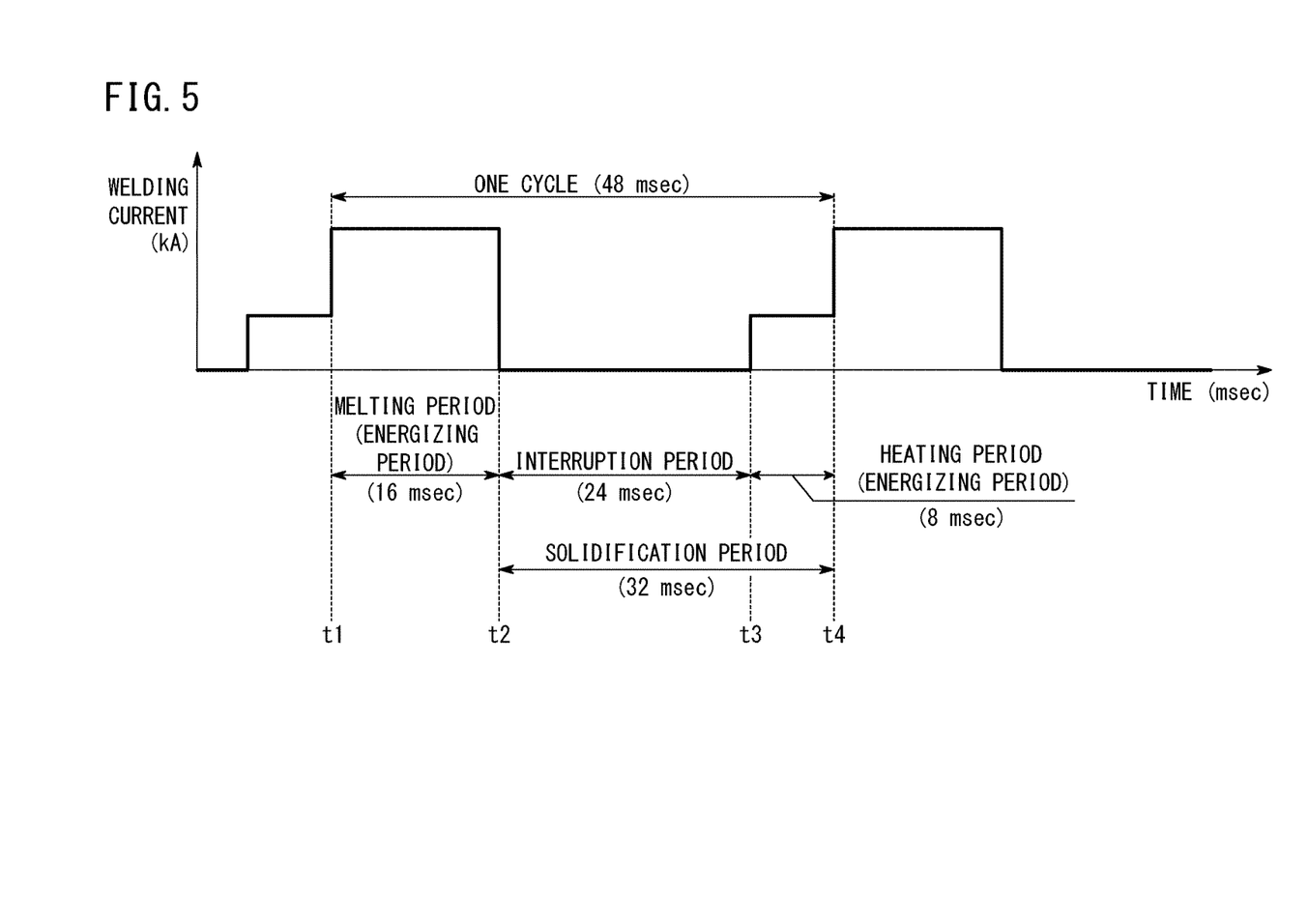
FIG. 5 is a timing chart for showing an energizing cycle of a seam-welding method according to a second embodiment of the present invention.

The difference in the energizing cycles between the first embodiment and the second embodiment is that the heating period within one cycle is implemented after the interruption period. More specifically, according to the second embodiment, between times t1 to t2, the switch is placed in an on state, and the melting period is brought about, in which the melting current i1 is supplied between the roller electrode pair. Next, between times t2 to t3, the switch is placed in an off state, and the interruption period is brought about, in which supply of the welding current between the roller electrode pair is interrupted. Thereafter, between times t3 to t4, a heating period is brought about, in which a heating current i2, which is smaller than the melting current i1, is supplied between the roller electrode pair. While repeating the aforementioned one cycle, the roller electrode pair is moved relatively, whereby a plurality of nuggets are formed mutually through overlapping portions, and it is possible to obtain a welded product in which the workpieces 24, 26 themselves are firmly connected.

Consequently, according to the seam-welding method, after the molten portion has been formed by supplying the melting current i1 within the melting period, by implementing the interruption period during which the supply of current is interrupted, the molten portion is allowed to solidify. In addition, after the interruption period, or stated otherwise, before the melting period in the next one cycle, the heating period is implemented, and by supplying the heating current i2, the stacked assembly 22 can be preheated to within a temperature range at which the molten portion remains solidified. More specifically, in the melting period of the next one cycle, the melting current i1 can be supplied with respect to the stacked assembly 22 in a state in which electrical resistance has been raised as a result of being heated in the above manner. As a result, since the molten portion can suitably be formed without increasing the melting current i1, the occurrence of spatter or the like can effectively be suppressed.

Further, in the foregoing manner, in the heating period as well, because the stacked assembly 22 is kept within a temperature range at which the molten portion solidifies, by the portion at which the heating period is provided, the proportion of the solidification period (e.g., 32 msec) with respect to the melting period (e.g., 16 msec) within one cycle (e.g. 48 msec) can be increased, and the timing at which solidification of the molten portion begins can be made to occur sooner. Therefore, even though the welding speed is increased, the molten portion can be solidified while the pressing forces F1, F2 are applied, and the occurrence of cracking in the nuggets or the like can be suppressed. As a result, while increasing the welding speed, joined products of high product quality can be obtained.

The invention is not limited to the embodiments described above, and it is a matter of course that various additional or modified configurations could be adopted therein based on the content disclosed in the present specification.

The invention claimed is:

1. A seam-welding method for performing seam welding by intermittently energizing or supplying current between a pair of roller electrodes that sandwich a stacked assembly formed by stacking a plurality of workpieces, together with causing the roller electrodes to move relatively while applying a pressing force with respect to the stacked assembly, the seam-welding method carrying out seam welding while repeating one cycle comprising:
   a melting period during which a melting current is supplied between the roller electrodes, and a molten portion is formed between the workpieces;
   a heating period implemented continuously with the melting period at least one of before and after the melting period, and during which a heating current, which is smaller than the melting current, is supplied between the roller electrodes, and the stacked assembly is heated within a temperature range lower than a predetermined solidification temperature of the molten portion; and
   an interruption period implemented continuously with a current-supplying period at least one of before and after the current-supplying period, and during which the supply of current between the roller electrodes is interrupted, the current-supplying period being made up of the melting period and the heating period.

2. The seam-welding method according to claim 1, wherein the heating period within the one cycle is implemented before the interruption period.

3. The seam-welding method according to claim 1, wherein the heating period within the one cycle is implemented after the interruption period.

4. A seam-welding device that performs seam welding by intermittently supplying current between a pair of roller electrodes that sandwich a stacked assembly formed by stacking a plurality of workpieces, together with causing the roller electrodes to move relatively while applying a pressing force with respect to the stacked assembly, the seam-welding device repeatedly supplying current and stopping supply of current in one cycle with respect to the roller electrodes, the one cycle including:
   a melting period during which a melting current is supplied, and a molten portion is formed between the workpieces;
   a heating period implemented continuously with the melting period at least one of before and after the melting period, and during which a heating current, which is smaller than the melting current, is supplied, and the stacked assembly is heated within a temperature range lower than a predetermined solidification temperature of the molten portion; and
   an interruption period implemented continuously with a current-supplying period at least one of before and after the current-supplying period, and during which the supply of current between the roller electrodes is interrupted, the current-supplying period being made up of the melting period and the heating period.

5. The seam-welding device according to claim 4, wherein the heating period within the one cycle is implemented before the interruption period.

6. The seam-welding device according to claim 4, wherein the heating period within the one cycle is implemented after the interruption period.

* * * * *